United States Patent
Koo et al.

(10) Patent No.: US 9,571,780 B2
(45) Date of Patent: Feb. 14, 2017

(54) DISPLAY DEVICE AND METHOD FOR CONTROLLING PANEL SELF REFRESH OPERATION THEREOF

(71) Applicant: LG DISPLAY CO., LTD., Seoul (KR)

(72) Inventors: Sungjo Koo, Gyeonggi-do (KR); Changgone Kim, Gyeonggi-do (KR); Jinsung Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 116 days.

(21) Appl. No.: 13/789,996

(22) Filed: Mar. 8, 2013

(65) Prior Publication Data

US 2013/0235941 A1 Sep. 12, 2013

(30) Foreign Application Priority Data

Mar. 9, 2012 (KR) ........................ 10-2012-0024318

(51) Int. Cl.
*H04N 5/63* (2006.01)
*G09G 5/00* (2006.01)

(52) U.S. Cl.
CPC ............... *H04N 5/63* (2013.01); *G09G 5/006* (2013.01); *G09G 2330/022* (2013.01); *G09G 2340/02* (2013.01); *G09G 2360/18* (2013.01); *G09G 2370/10* (2013.01)

(58) Field of Classification Search
CPC .................. G09G 2320/103; G09G 2330/021; G09G 5/006; G09G 2370/10; G09G 2360/18; G09G 2330/022; G09G 2340/02; H04N 5/63

See application file for complete search history.

(56) References Cited

U.S. PATENT DOCUMENTS

| | | | |
|---|---|---|---|
| 5,778,411 A * | 7/1998 | DeMoss et al. | 711/4 |
| 2003/0174894 A1* | 9/2003 | Matherson | H04N 5/361 382/233 |
| 2009/0080462 A1* | 3/2009 | Mueller et al. | 370/476 |
| 2012/0120083 A1* | 5/2012 | Kong | G09G 5/003 345/545 |
| 2012/0206461 A1* | 8/2012 | Wyatt et al. | 345/501 |
| 2013/0187937 A1* | 7/2013 | Kerofsky et al. | 345/530 |
| 2013/0235055 A1* | 9/2013 | Kim et al. | 345/545 |

* cited by examiner

*Primary Examiner* — Xiao Wu
*Assistant Examiner* — Chong Wu
(74) *Attorney, Agent, or Firm* — Morgan, Lewis & Bockius LLP

(57) ABSTRACT

A display device includes a source unit; and a sink unit connected with the source unit via an embedded display port interface for signal transmission between the source and sink units and to enable a panel self refresh (PSR) mode for reducing power consumption; a still image detector that is included in the source unit, and analyzes an input image to detect a still image; a compressor that is included in the source unit and losslessly compresses data of the still image by using a previously stored compression algorithm; and a PSR controller that is included in the source unit, compares a size of the losslessly compressed data with a size of a frame buffer of the sink unit in order to determine whether the data of the still image can be stored in the frame buffer in a losslessly compressed format without loss.

11 Claims, 3 Drawing Sheets

DISPLAY DEVICE AND METHOD FOR CONTROLLING PANEL SELF REFRESH OPERATION THEREOF

This application claims the benefit of Korea Patent Application No. 10-2012-0024318 filed on Mar. 9, 2012, which is incorporated by reference for all purposes as if fully set forth herein.

BACKGROUND

Field

This document relates to a display device including a panel self-refresh function, and a method for controlling a panel self refresh operation thereof.

Related Art

As display devices are getting larger in size and higher in resolution, there arises a demand for a high-performance interface for transmitting signals between a video source and a display device. To cope with this demand, Vx1 is becoming a substitute for a TV, and DisplayPort (hereinafter, 'DP') is becoming a substitute for a laptop in the case of IT products.

A DP (DisplayPort) interface is an interface regulated by Video Electronics Standards Association (VESA) and is an interface scheme which integrates LVDS (Low Voltage Differential Signaling), the existing internal interface standard, with DVI (Digital Visual Interface), an external connection standard. The DP interface is a technique which can digitally make not only an internal connection between chips but also an external connection between products. As the two divided interfaces are integrated, it is possible to support higher color depth and resolution by widening data bandwidth. The DP interface has a bandwidth of up to 10.8 Gbps, which is twice or more that of the existing DVI (maximum 4.95 Gbps), and can simultaneously transmit up to six streams of 1080i (three streams of 1080p) through one connector connection by supporting multi-streams using a micro-packet architecture.

Recently, VESA announced a new version of the Embedded DisplayPort (hereinafter, referred to as 'edP'). eDP is a companion standard to the DP interface designed for embedded display applications, including notebook PCs, tablets, netbooks and all-in-one desktop PCs. eDP v1.3 includes a new Panel Self-Refresh (PSR) technology that was developed to save system power and further extend battery life in portable PC systems. The PSR technology uses a memory mounted in a display to display an original image as it is while minimizing power consumption, thereby increasing battery usage time in portable PC systems.

FIG. 1 is an overview of the PCR technology included in edP v1.3.

Referring to FIG. 1, a display device capable of a PSR operation comprises a source unit 10 and a sink unit 20. The source unit 10 indicates a system, and comprises an eDP transmitter 11. The sink unit 20 indicates a panel portion, and comprises a timing controller 23 and a display unit 24. The timing controller 23 comprises an eDP receiver 21 and a remote frame buffer 20 (hereinafter, referred to as 'RFB'). The source unit 10 and the synch unit 20 communicate with each other via an eDP interface.

The display device activates the PSR mode when a still image having no change in display is input, and deactivates the PSR mode in the case of video but not still images. When the PSR mode is activated, still image data is transmitted from the eDP transmitter 11 to the eDP receiver 21 and then stored in the RFB 22. Then, the operating power of the source unit 10 is turned off, and the data store in the RFB 22 is applied to the display unit 24. Until the RFB 22 is updated with new still image data, the operating power of the source unit 10 remains in the off state, and the display unit 24 continues to display the data stored in the RFB 22. That is, when the PSR mode is activated, the display automatically remains the same by the data stored in the RFB 22 even when the working power of the source unit 10 is in the off state. This leads to reduced power consumption and increased battery usage time without the user's recognition.

Meanwhile, when the PSR mode is deactivated, data to be transmitted from the eDP transmitter 11 to the eDP receiver 21 is applied to the display unit 24 without being stored in the RFB 22, and the operating power of the source unit 10 continues to remain in the on state. When the PSR mode is deactivated, power consumption is not reduced.

To perform the PSR mode, the RFB 22 needs to be mounted in the sink unit 20, as mentioned above. The RFB 22 is a component that should be added for the PSR mode, and hence causes a rise in manufacturing costs. Moreover, the PSR mode requires the system power to be turned on/off without the user's recognition (i.e., while the display remains the same). Thus, the original image data should not be lost when stored in the RFB 22. The size of the RFB 22 should be large enough to avoid loss of the original image. However, the use of a large-size RFB 22 will bring about a rise in manufacturing costs and makes it difficult to incorporate the RFB 22 in the sink unit 20, i.e., the timing controller 23.

A variety of lossless data compression methods can be taken into account as an alternative for reducing the size of the RFB 22 and preventing loss of an original image. Still, there has been no method capable of lossless compression of all images that are input within a limited hardware capacity.

SUMMARY

An aspect of this document is to provide a display device, which comprises an eDP interface, and can reduce the size of a frame buffer mounted on a sink unit and prevent loss of an original image when the panel self refresh mode for saving power consumption is performed, and a method for controlling a panel self refresh operation thereof.

To accomplish the above aspect, according to an exemplary embodiment of the present invention, there is provided a display device comprising: a source unit; and a sink unit operatively connected with the source unit via an embedded display port (eDP) interface to provide signal transmission between the source unit and the sink unit and to enable a panel self refresh (PSR) mode for reducing power consumption; a still image detector that is included in the source unit, and analyzes an input image to detect a still image; a compressor that is included in the source unit and losslessly compresses data of the still image by using a previously stored compression algorithm; and a PSR controller that is included in the source unit, compares a size of the losslessly compressed data with a size of a frame buffer of the sink unit in order to determine whether the data of the still image can be stored in the frame buffer in a losslessly compressed format without loss, and activates the panel self refresh mode and controls transmission of the losslessly compressed image to the sink unit only when the size of the losslessly compressed data is equal to or less than the size of the frame buffer.

According to an exemplary embodiment of the present invention, there is provided a method for controlling a panel self refresh operation of a display device which provides signal transmission between a source unit and a sink unit via an eDP interface and enables a panel self refresh mode for reducing power consumption, the method comprising: analyzing an input image; when the input image is a still image as a result of the analysis, losslessly compressing, by the source unit, data of the still image by using a previously stored compression algorithm; comparing a size of the losslessly compressed data with a size of a frame buffer of the sink unit to determine whether the data of the still image can be stored in a losslessly compressed format without loss; and only when the size of the losslessly compressed data is equal to or less than the size of the frame buffer, activating the panel self refresh mode and transmitting the losslessly compressed image from the source unit to the sink unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention In the drawings.

DETAILED DESCRIPTION

Figure 1:
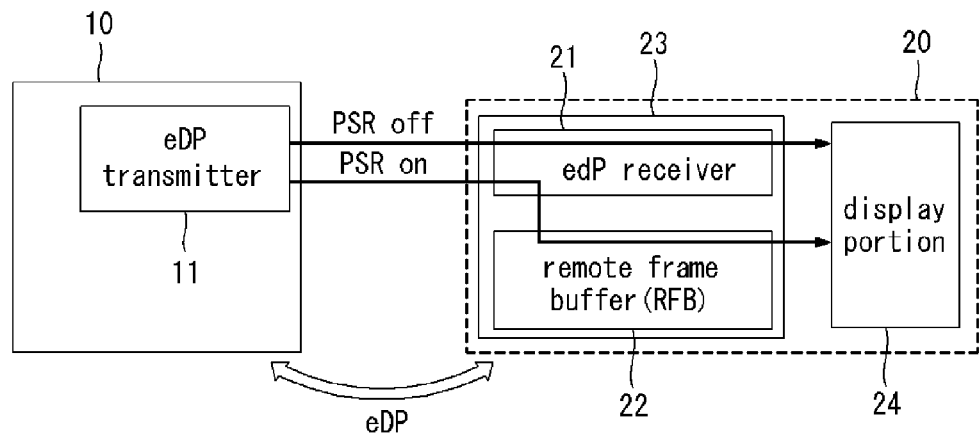
FIG. 1 is an overview of the PCR technology included in edP v1.3.

Hereinafter, exemplary embodiments of the present invention will be described in detail with reference to the attached drawings. Throughout the specification, the same reference numerals indicate substantially the same components. In connection with description of the present invention hereinafter, if it is considered that description of known functions or constructions related to the present invention may make the subject matter of the present invention unclear, the detailed description thereof will be omitted.

Figure 2:
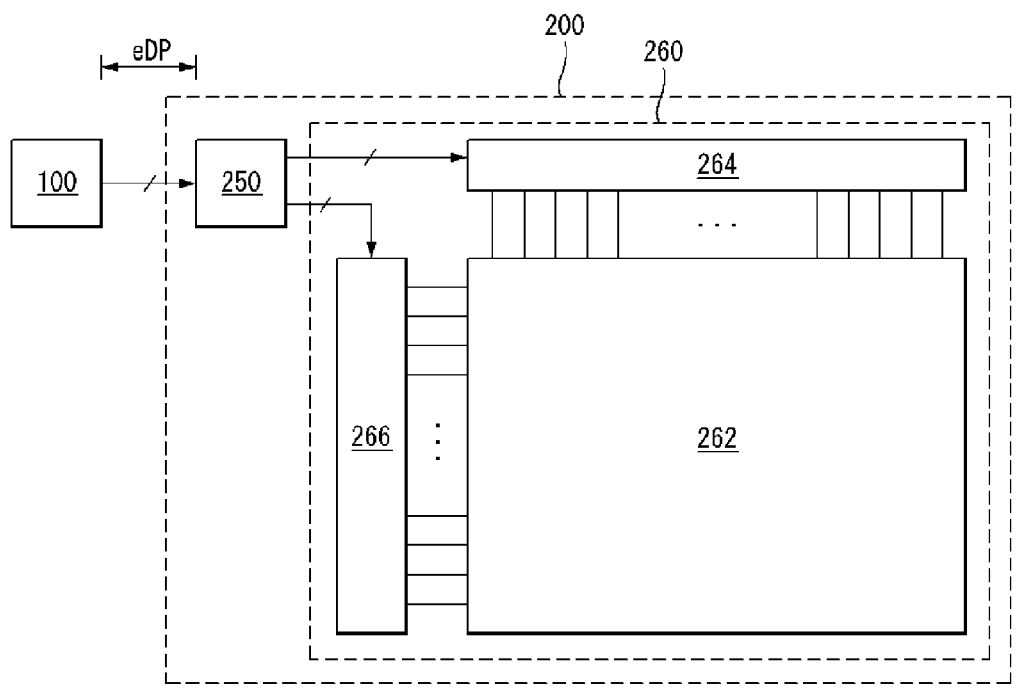
FIG. 2 is a view schematically showing a display device comprising an eDP interface according to an exemplary embodiment of the present invention.

FIG. 2 is a view schematically showing a display device comprising an eDP interface according to an exemplary embodiment of the present invention.

Referring to FIG. 2, the display device of the present invention comprises a source unit 100 and a sink unit 200.

The source unit 100 indicates a system. The sink unit 200 indicates a panel portion, which comprises a timing controller 250 and a display portion 260. The source unit 100 and the sink unit 200 communicate with each other via an eDP interface.

The source unit 100 transmits video data to the timing controller 250 included in the sink unit 200 through the eDP transmitter. The timing controller 250 receives video data through the eDP receiver, and applies the video data to the display portion 260. Moreover, the timing controller 250 generates timing control signals for controlling operation timings of driving circuits 264 and 266 included in the display portion 260. An interface for data transmission between the timing controller 250 and the data driving circuit 264 may be, but not limited to, a mini LVDS interface.

The display portion 260 may comprise a display panel 262, a data driving circuit 264, and a scan driving circuit 266.

The display panel 262 is provided with data lines and scan lines (or gate lines) which intersect each other. The display panel 262 comprises pixels formed in a matrix, which are defined by the data lines and the scan lines. Thin film transistors (TFTs) may be formed at the intersections of the data lines and scan lines of the display panel 262. The display panel 262 may be implemented by a display panel of a flat panel display such as a liquid crystal display (LCD), a field emission display (FED), a plasma display panel (PDP), electroluminescence (EL) devices including inorganic or organic light emitting diodes, or an electrophoresis display (EPD). If the display panel 262 is implemented by the display panel of the LCD, a backlight unit is required. The backlight unit may be implemented by a direct type backlight unit or an edge type backlight unit.

The data driving circuit 264 latches digital video data under the control of the timing controller 250. The data driving circuit 264 converts the digital video data into data voltages which are output to the data lines. The scan driving circuit 266 sequentially supplies scan pulses synchronized with the data voltages to the scan lines under the control of the timing controller 250.

The display device according to the present invention has the following technical features in order to prevent loss of an original image, while reducing a size of a remote frame buffer for a PSR operation.

(1) A remote frame buffer installed in the sink unit 200 according to the present invention has a size smaller than that required for storing frame image information in an uncompressed format, thus contributing to a reduction in size.

(2) In an embodiment of the present invention, data of an input still image is losslessly compressed in the source unit 100 by using a particular data compression algorithm, and only when a size of the compressed data does not exceed a size of the remote frame buffer, a PSR operation is performed. In order to perform PSR operation, in an embodiment of the present invention, a compressed image is transmitted to the sink unit 200, and thereafter, stored in the remote frame buffer.

Meanwhile, when the size of the compressed data exceeds the size of the remote frame buffer, lossless compression is impossible and data loss is anticipated, so in an embodiment of the present invention, an uncompressed normal image is transmitted to the sink unit 200. In the case in which a normal image is transmitted, a PSR mode is deactivated. That is, in an embodiment of the present invention, lossless compression is performed, and when data loss is inevitable due to a low compression rate according to an image in limited hardware, the PSR operation is rejected.

(3) In an embodiment of the present invention, since the source unit 100 losslessly compresses data of an input image data and transmits the compressed image to the sink unit 200 for a PSR operation, when an amount of data transmission can be reduced in the PSR mode, additionally reducing power consumption.

Figure 3:
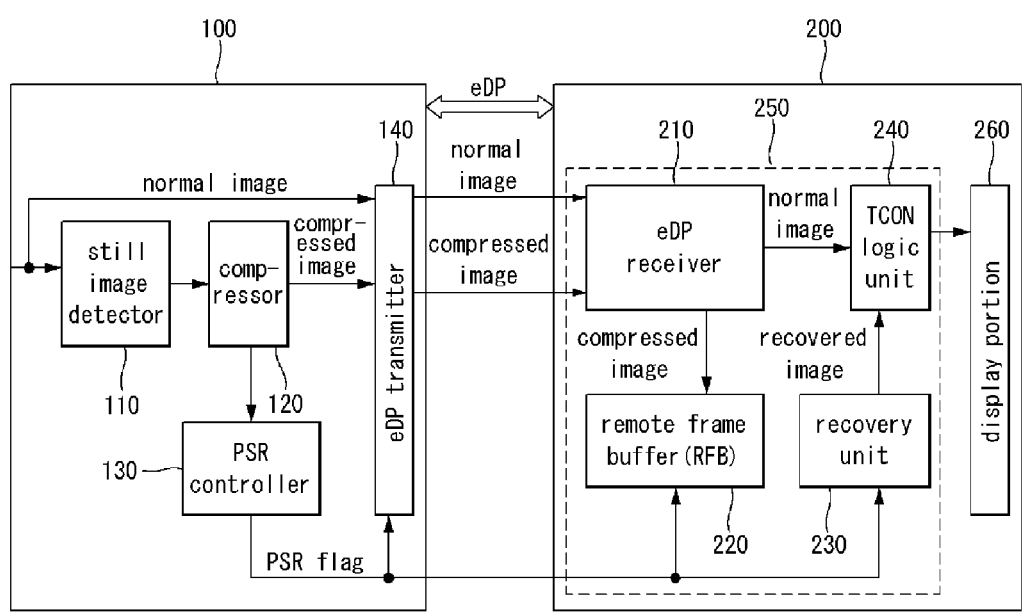
FIG. 3 is a view illustrating a detailed configuration of a source unit and a sink unit for a PSR operation.

FIG. 3 is a view illustrating a detailed configuration of a source unit and a sink unit for a PSR operation.

The source unit 100 may comprise a still image detector 110, a compressor 120, a PSR controller, and an eDP transmitter 120.

The still image detector 110 can detect a still image in a variety of methods. For example, the still image detector 110 compares consecutively input image data in units of frames.

As a result of comparison, if a variation in image data between neighboring frames is less than a predetermined threshold value, the still image detector 110 can detect the then image as a still image. On the other hand, if the variation in image data between the neighboring frames is greater than the threshold value as the result of comparison, the still image detector 110 detects the then image as video.

The compressor 120 lossless compresses the still image data, input from the still image detector 110, by using a stored compression algorithm. The lossless compression refers to a compression method in which an image recovered from a compressed image completely matches the original image (pre-compression image) as encoding and decoding processes are perfectly performed.

Lossy compression is in contrast with lossless compression. The lossy compression is a compression method which increases compression rate by eliminating redundant or less-important information from an image. Most image compression techniques are lossy. The lossy compression method uses a fixed compression ratio and involves compressing all data at a fixed compression ratio. According to the lossy compression method, there occurs a difference between original data and recovered data during data recovery due to a compression loss. However, there has to be no change in the display, caused by a data loss, in the PSR mode of the present invention (that is, the system power has to be turned on and off while the display continues to remain the same), the lossy compression method cannot be applied to the present invention.

Lossless compression algorithms that can be used in the compressor 120 include 'Run length encoding', 'Huffman encoding', 'Arithmetic encoding', etc. These lossless compression algorithms are more focused on complete data recovery than on data compression. With lossless compression, the compression ratio varies depending on images, and therefore the compression rate of a specific image may be significantly lowered.

The PSR controller 130 compares capacity of compressed data and capacity of a remote frame buffer (RFB) 220, and turns on or off a PSR operation according to the comparison result. In order to reduce comparison calculation, the PSR controller 130 may use address sizes as compression targets. To this end, the PSR controller 130 generates an address to store data compressed by the compression algorithm in the RFB 220. This address specifies a position at which compressed data is to be stored in the RFB 220. The PSR controller 130 determines whether the compressed data can be stored in the RFB 220 by comparing the size of the currently generated address with a predetermined maximum address size of the RFB 220. The size of the currently generated address indicates the size of the compressed data, and the maximum address size of the RFB 220 indirectly indicates the size of the RFB 220. By using address size in a comparison operation, size comparison is easily done even with a small amount of operation.

If the size of compressed data is less than the size of the RFB 220, the PSR controller 230 generates a PSR flag bit as a first logic in order to activate the PSR mode. On the other hand, if the size of compressed data exceeds the size of the RFB 220, the PSR controller 230 generates a PSR flag bit as a second logic in order to deactivate the PSR mode.

The eDP transmitter 140 selectively transmits a compressed image or a normal image (uncompressed image) to the sink unit 200 according to a logic of the PSR flag bit. The eDP transmitter 140 transmits a compressed image for a PSR mode according to a PSR flag bit of a first logic to the sink unit 200 through an eDP interface. In the state in which the PSR mode is activated, when the transmission of a compressed image is terminated, the operation power of the source unit 100 is turned off. The eDP transmitter 140 transmits a normal image for a non-PSR mode to the sink unit 200 through an eDP interface according to a PSR flag bit of a second logic. In the non-PSR mode, an operation power of the source unit 100 is not turned off.

In the non-PSR mode, the source unit 100 does not retry PSR operation until when a new still image enabling the PSR mode is input, thus preventing unnecessary power consumption.

The timing controller 250 of the sink unit 200 may include an eDP receiver 210, an RFB 220, a recovery unit 230, and a TCON logic unit 240.

The eDP receiver 210 is configured to correspond to the eDP transmitter 140 and connected to the eDP transmitter 140 through an eDP interface. The eDP receiver 210 may receive signals output from the eDP transmitter 140 through the eDP interface, and also, the eDP receiver 210 may feed back request signals related to PSR mode to the eDP transmitter 140 through the eDP interface.

The RFB 220 may perform a memory function for storing data. An operation of the RFB 220 may be activated by a PSR flag bit of a first logic, and stopped by a PSR flag bit of a second logic. The PSR mode is basically for reducing power consumption, and the RFB 220 is an element to be added for the PSR mode. Although a larger size of the RFB 220 is advantageous in preventing a display change during the PSR mode, this leads to higher manufacturing costs. It is not possible to raise the manufacturing costs without limit in order to slightly reduce power consumption. Accordingly, the RFB 220 should be reduced in size such that it has a smaller size than the size required to store uncompressed image information of one frame altogether. The size of the RFB 220 may be limited such that it is $1/k$ (k is a real number greater than 1) of the required size. For example, if k is 3, the size of the RFB 240 is reduced to $\frac{1}{3}$ of the required size.

Whether to operate the recovery unit 230 is determined according to a logic of a PSR flag bit, like the RFB 220. An operation of the recovery unit 230 is activated by a PSR flag big of a first logic, and stopped by a PSR flag bit of a second logic. When the PSR mode is activated, the recovery unit 230 is operated to recover compressed data stored in the RFB 220 to generate a recovered image. The recovered image is the same as the original input image.

The TCON logic unit 240 applies the recovered image, input from the recovery unit 230, to the display portion 260. On the other hand, when the PSR mode is deactivated, the ICON logic unit 240 may apply a normal image directly from the eDP receiver 210 to the display portion 260. The ICON logic unit 240 may generate control signals for controlling the driving circuits included in the display portion 260.

Figure 4:
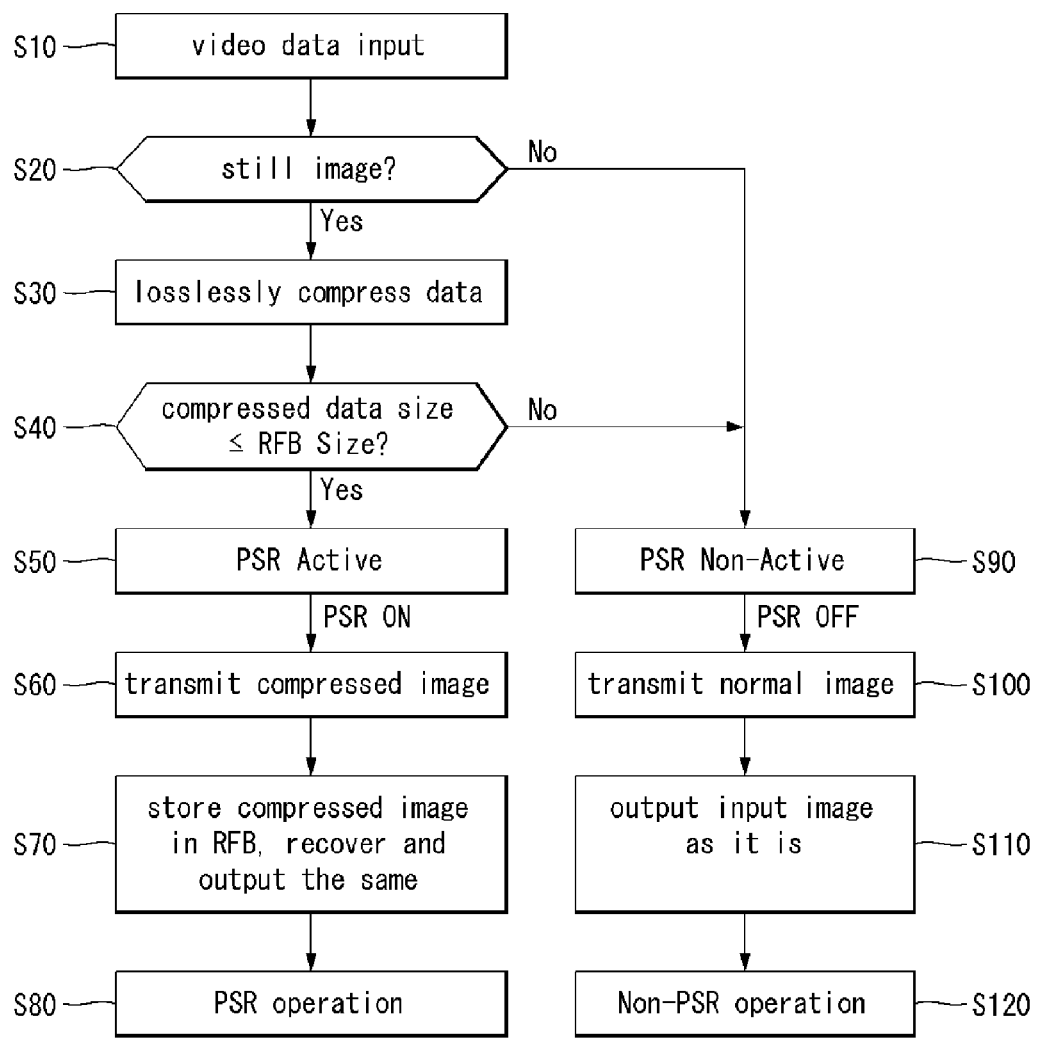
FIG. 4 sequentially shows a method for controlling a PSR operation of a display device according to an exemplary embodiment of the present invention.

FIG. 4 sequentially shows a method for controlling a PSR operation of a display device according to an exemplary embodiment of the present invention.

Referring to FIG. 4, the method for controlling the PSR operation of the display device according to the present invention may comprise the following configuration for reducing the size of the RFB and preventing loss of the original image.

In the method for controlling the PSR operation of the display device according to the present invention, the source unit determines whether or not an input image is a still image by analyzing input video data (S10 and S20).

In the method for controlling the PSR operation of the display device according to the present invention, if the input image is a still image as a result of determination, the source unit losslessly compresses the still image data by using a previously stored compression algorithm (S30).

In the method for controlling the PSR operation of the display device according to the present invention, the size of compressed data and the size of the RFB are compared in order to determine whether or not still image data, losslessly compressed, can be stored in the RFB without loss (S40). In the method for controlling the PSR operation of the display device according to the present invention, in order to simplify the comparison operation, an address may be generated to store losslessly compressed data in the RFB, and the source unit may compare the address size with a predetermined maximum address size of the RFB.

In the method for controlling the PSR operation of the display device according to the present invention, if the size of losslessly compressed data is equal to or less than the size of the remote frame buffer, it is determined that lossless compression and storage are possible, and the PSR mode is activated and the source unit transmits the compressed image to the sink unit (S50, S60).

When the transmission of the compressed image in the PSR mode is completed, the operating power of the source unit is turned off. In this state, the sink unit recovers the compressed data stored in the RFB and then applies it to the display portion (S70). Once the PSR mode is activated, the display automatically remains the same by the operation of the sink unit 200 alone even when the operating power of the source unit 100 is in the off state (S80). This leads to reduced power consumption and increased battery usage time without the user's recognition.

In the method for controlling the PSR operation of the display device according to the present invention, when the input image is not a still image as a result of the determination in step S20, the PSR mode is deactivated. Also, in the method for controlling the PSR operation of the display device according to the present invention, if the size of data losslessly compressed by the compression algorithm exceeds the size of the RFB as a result of comparison in step S40, it is determined that lossless compression and storage are impossible, and the PSR mode is deactivated (S90).

In the method for controlling the PSR operation of the display device according to the present invention, when the PSR mode is activated, an uncompressed normal image is transmitted from the source unit to the sink unit, and the sink unit outputs the normal image as it is to the display portion (S100 and S110). Thus, non-PSR mode is performed (S120).

As described above, in the display device and the method for controlling the panel self refresh operation thereof, a remote frame buffer is mounted which has a smaller size than the size required to store uncompressed image information of one frame, and it is determined whether or not an input image can be losslessly compressed and stored in the remote frame buffer. In the present invention, an input image is compressed by a lossless compression method in which the compression ratio varies depending on images. Thereafter, the PSR mode is performed only when the size of compressed data does not exceed the size of the remote frame buffer, and stops the PSR mode if the size of compressed data exceeds the size of the remote frame buffer. That is, even when lossless compression is performed, the PSR mode is denied if data loss is inevitable due to a low compression rate for some images within limited hardware. Accordingly, the panel self refresh mode for reducing power consumption can contribute to reducing the size of the frame buffer mounted on the sink unit and preventing loss of the original image.

In addition, the source unit losslessly compresses data of an input still image and transmits the compressed image to the sink unit for a PSR mode, an amount of data transmission can be reduced in the PSR mode, thus additionally reducing power consumption.

What is claimed is:

1. A display device, comprising:
    a source; and
    a sink operatively connected with the source via an embedded display port (eDP) interface to provide signal transmission between the source and the sink and to enable a panel self refresh (PSR) mode for reducing power consumption;
    a still image detector that is included in the source, and analyzes an input image to detect a still image;
    a compressor that is included in the source and losslessly compresses data of the still image by using a previously stored compression algorithm; and
    a PSR controller that is included in the source, determines a size of the losslessly compressed data, compares the size of the losslessly compressed data with a size of a frame buffer of the sink in order to determine whether the data of the still image can be stored in the frame buffer in a losslessly compressed format without loss, and activates the panel self refresh mode and controls transmission of the losslessly compressed image to the sink only when the size of the losslessly compressed data is equal to or less than the size of the frame buffer,
    wherein the PSR controller generates an address to store the compressed data in the frame buffer, and compares a size of the generated address with a predetermined maximum address size of the frame buffer, to compare the size of the compressed data with the size of the frame buffer, and
    wherein the source comprises an eDP transmitter configured to:
        receive both of a normal uncompressed image data and the losslessly compressed data of the still image, and
        selectively transmit, to an eDP receiver in the sink:
            the normal uncompressed image data in a normal display mode, and
            the losslessly compressed data of the still image in the PSR mode.

2. The display device of claim 1, wherein when the size of the losslessly compressed data exceeds the size of the frame buffer, the PSR controller deactivates the panel self refresh mode and controls transmission of the same normal image as the input image to the sink.

3. The display device of claim 2, wherein when the panel self refresh mode is deactivated, the source does not retry the panel self refresh mode until when a new still image enabling the panel self refresh mode is input.

4. The display device of claim 2, wherein the source is configured such that after the panel self refresh mode is deactivated, the source does not losslessly compress data, determine a size of the losslessly compressed data, and compare the size of the losslessly compressed data, until the still image detector detects a new still image.

5. The display device of claim 1, wherein the frame buffer has a smaller size than the size required to store one frame of the still image in an uncompressed format without loss.

6. The display device of claim 1, wherein after the compressed image is transmitted to the sink:
    operating power of the source is turned off;

the sink stores the data of the compressed image in the frame buffer; and thereafter, the sink:
recovers the compressed data stored in the frame buffer in the state that the operating power of the source is in the off state; and
applies the recovered data to a display portion for image display.

7. A method for controlling a panel self refresh (PSR) operation of a display device which provides signal transmission between a source and a sink via an embedded display port (eDP) interface and enables a panel self refresh mode for reducing power consumption, the method comprising:

analyzing an input image;
when the input image is determined to be a still image in the analysis of the input image, losslessly compressing, by the source, data of the still image by using a previously stored compression algorithm;
determining a size of the losslessly compressed data;
comparing the size of the losslessly compressed data with a size of a frame buffer of the sink to determine whether the data of the still image can be stored in a losslessly compressed format without loss; and
only when the size of the losslessly compressed data is equal to or less than the size of the frame buffer, activating the panel self refresh mode and transmitting the losslessly compressed image from the source to the sink,
wherein the comparing the size of the losslessly compressed data with the size of a frame buffer of the sink includes generating an address to store the compressed data in the frame buffer, and comparing a size of the generated address with a predetermined maximum address size of the frame buffer, and wherein the source comprises an eDP transmitter configured to:
receive both of a normal uncompressed image data and the losslessly compressed data of the still image, and
selectively transmit, to an eDP receiver in the sink:
the normal uncompressed image data in a normal display mode, and
the losslessly compressed data of the still image in the PSR mode.

8. The method of claim 7, further comprising when the size of the losslessly compressed data exceeds the size of the frame buffer:
deactivating the panel self refresh mode; and
transmitting the same normal image as the input image to the sink.

9. The method of claim 8, wherein, in the transmitting of the normal image from the source to the sink, when the panel self refresh mode is deactivated, the panel self refresh mode is not retried until when a new still image enabling the panel self refresh mode is input.

10. The method of claim 7, wherein the frame buffer has a smaller size than the size required to store one frame of the still image in an uncompressed format without loss.

11. The method of claim 7, further comprising:
turning off operating power of the source after the compressed image is transmitted to the sink;
after the data of the compressed image is stored in the frame buffer, recovering the compressed data stored in the frame buffer in a state that the operating power of the source is in an off state; and
applying the recovered image to a display portion for image display.

* * * * *